Oct. 19, 1954     G. DE PIOLENC ET AL     2,692,296
GLASS MELTING FURNACE Filed Jan. 4, 1952     6 Sheets-Sheet 1

FIG.1.

INVENTORS
Gerard de Piolenc
Robert G. Russell
BY
ATTORNEYS

INVENTORS
Gerard de Piolenc
Robert G. Russell
ATTORNEYS

Patented Oct. 19, 1954

2,692,296

UNITED STATES PATENT OFFICE 2,692,296

GLASS MELTING FURNACE

Gerard De Piolenc and Robert G. Russell, Granville, Ohio, assignors to Owens-Corning Fiberglas Corporation, Toledo, Ohio, a corporation of Delaware Application January 4, 1952, Serial No. 264,878

6 Claims. (Cl. 13—6)

This invention relates to glass melting furnaces and more particularly to a glass melting furnace designed for a continuous melting operation as, for example, for the continuous production of glass filaments. One of the most useful purposes for a furnace embodying the instant invention is in the production of fine glass filaments, called glass fibers in the trade, which are used for the manufacture of textile strands and fabrics.

Because glass melts and flows only at high temperatures because it contains many highly corrosive constituents and because of the highly corrosive action of air on base metals raised to high temperatures, melting furnaces for the continuous melting of glass for the formation of continuously drawn fibers, heretofore usually have employed heating and fiber forming elements fabricated from a considerable weight of a noble metal, for example platinum. The noble metal element usually forms the bottom and side portions of an enclosure so as to provide a large heat transfer area. The element may be heated by a high amperage electrical current to a temperature sufficiently high to melt the glass within the unit or furnace and usually is perforated across its generally horizontal bottom with orifices of a size selected to allow appropriately sized glass streams to flow therethrough when the mass of glass being heated reaches the proper temperature. A unit of this type is generally referred to as a "bushing" in the trade.

Where the heating and forming "bushing" consists in a single element as in most prior art furnaces, it is necessary to provide a substantial surface area in contact with the glass and to raise its temperature to a very high level in order to transfer sufficient heat to the glass to melt it and maintain it in the molten state.

Because noble metal must be employed for these bushings in order to provide a sufficiently long life under the corrosive action of the glass and air and in order to withstand the high temperatures necessary to properly liquefy the glass, bushings of this type employ very heavy heating and forming elements costing many hundreds of dollars and tying up large quantities of noble metal, preferably platinum, in their installations.

It is the principal object of this invention to provide a unit furnace for continuously melting and producing glass filaments of the type generally referred to in which the quantity of noble metal employed can be greatly reduced without any loss in efficiency or decrease in the useful life of the glass filament forming units.

It is another object of this invention to provide a glass melting furnace in which the corrosive action of air on the heating elements is substantially obviated.

It is yet another object of this invention to provide a glass melting furnace in which base metals can be employed either alone or in alloy for the fabrication of an electrically energized heating element.

Still another object of this invention is to provide a unitary electrical glass melting furnace in which both surfaces of a heating element are employed for heat transferral.

The invention consists in the utilization of a melting element located in the interior of the glass melting chamber of the furnace where heat generated within it can be directly transferred to the glass being melted.

Because the efficiency of heat transferral from the submerged melting element to the mass of glass which surrounds it is greater than that of conventional units where the glass containing chamber walls and bottom are heated, the total quantity of metal used in the heating element and the bottom bushing of the invention is substantially less than that employed in a prior art device. This results not only in a saving in the cost of the precious metal used in the furnace but, even more important, it permits a quantity of less scarce material to be used in place of a greater quantity of the scarce noble metal formerly required.

The mode of operation of a furnace embodying the invention will be better understood from the specification which follows and from the drawings, in which.

A glass melting furnace or unit embodying the invention may have an outer casing 10 (Fig. 1) which may be fabricated from sheet or cast metal and serves as a housing for the furnace unit. The casing 10 is shown as being provided with a pair of raw material feeding lines 11 through which cullet or batch may be fed at a substantially constant rate determined either directly, or through intermediate controls, by the rate of flow of the glass filaments or fibers being drawn from the furnace. In the illustrated embodiment of the invention the feeding lines 11 are shown (Figs. 2 and 3) as tubes and, as is frequently the case in similar furnaces of the prior art, the material to be melted may be fed to a furnace embodying the invention in the form of "marbles" or spherical portions of pre-melted and resolidified glass. The use of such a material eliminates many problems of fining and purification which would exist were the material to be melted in the furnace presented thereto in the form of batch.

The rate of feeding of the "marbles" (which are not shown in the drawings) may be controlled by auxiliary mechanism or it may result from the gravity flow of material through the furnace as the glass flows therefrom.

While a furnace of the invention operates especially well when the material fed thereto is cullet, for example the "marbles" mentioned, its operation is not limited to, nor does it require, the use of any particular physical form of raw material. Batch (raw, pre-mixed glass constituents) has been and may be used. Of course, when batch is employed, a modified feeding means may also be used to insure thorough mixture and continued feed and to avoid the introduction into the furnace of any substantial quantity of entrained air.

Figure 1:
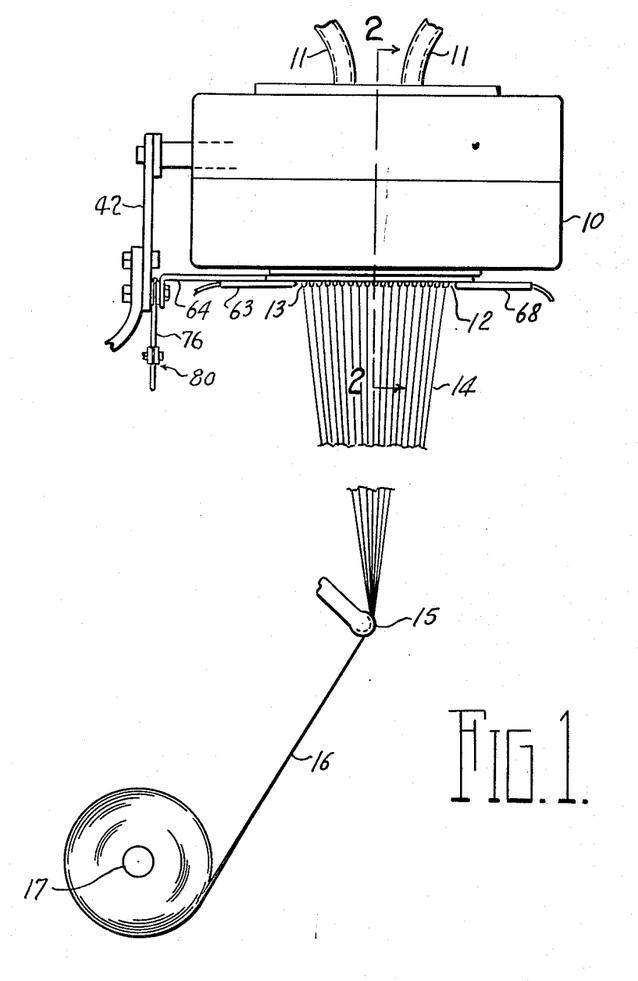
Fig. 1 is a view in elevation of a furnace embodying the invention showing its use for the formation of fine glass fibers which are collected and assembled in the form of a strand for subsequent use in the fabrication of textiles and other products.

At the bottom of the casing 10, in common with similar melting furnaces of the prior art, a melting furnace embodying the invention is provided with a "bushing" generally indicated at 12 which has a plurality of fiber forming orifices 13 (see also Fig. 6) through each of which a glass filament or fiber 14 first flows, and then is drawn. The fibers 14, as is best seen in Fig. 1, are attenuated or gathered together by means of a gathering eye 15 over which they pass and thence, in the form of a strand 16, may be wound upon a spool 17 or otherwise gathered in packages for subsequent end uses such as the spinning of textile fabrics, the fabrication of ropes, cords and twines, etc.

Figures 2, 9, 10:
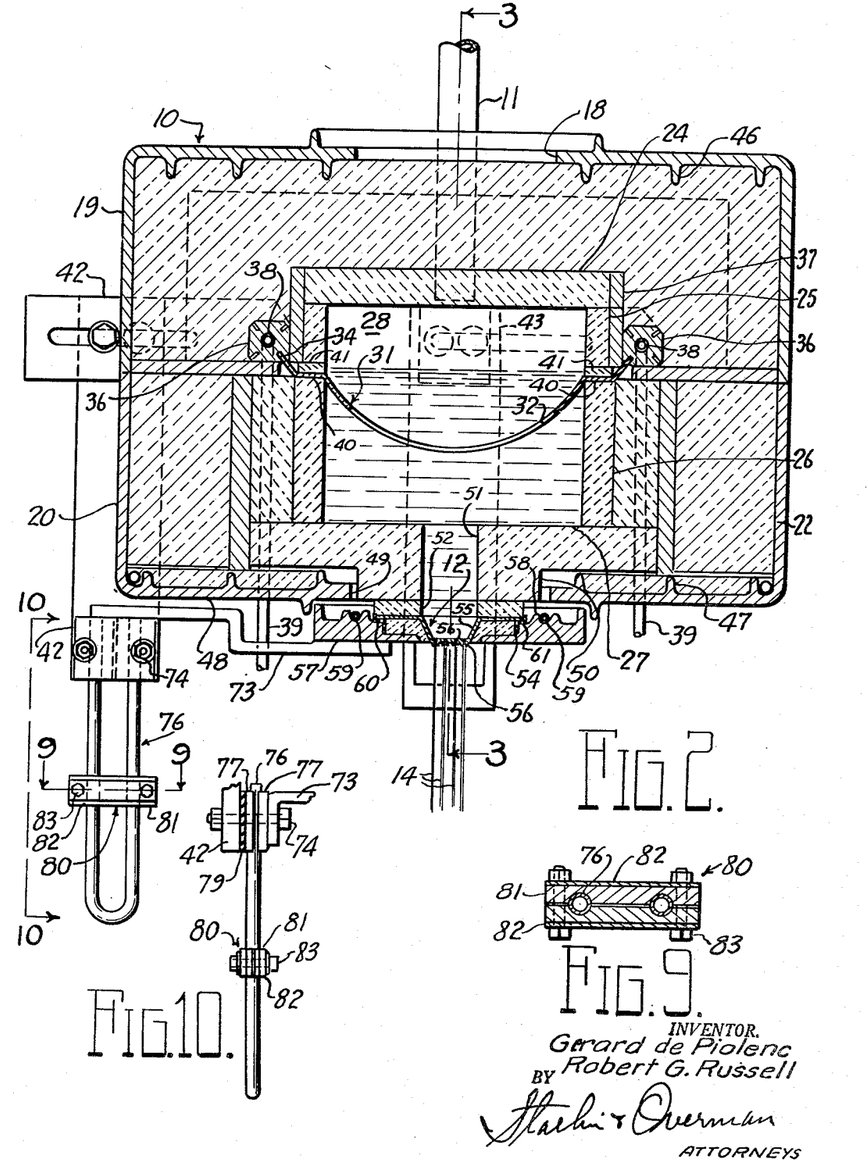
Fig. 2 is a transverse vertical sectional view on an enlarged scale taken substantially on the line 2—2 of Fig. 1.
Fig. 9 is an enlarged sectional view taken on the line 9—9 of Fig. 2.
Fig. 10 is a fragmentary view in elevation taken from the position indicated by the line 10—10 of Fig. 2.
Figure 3:
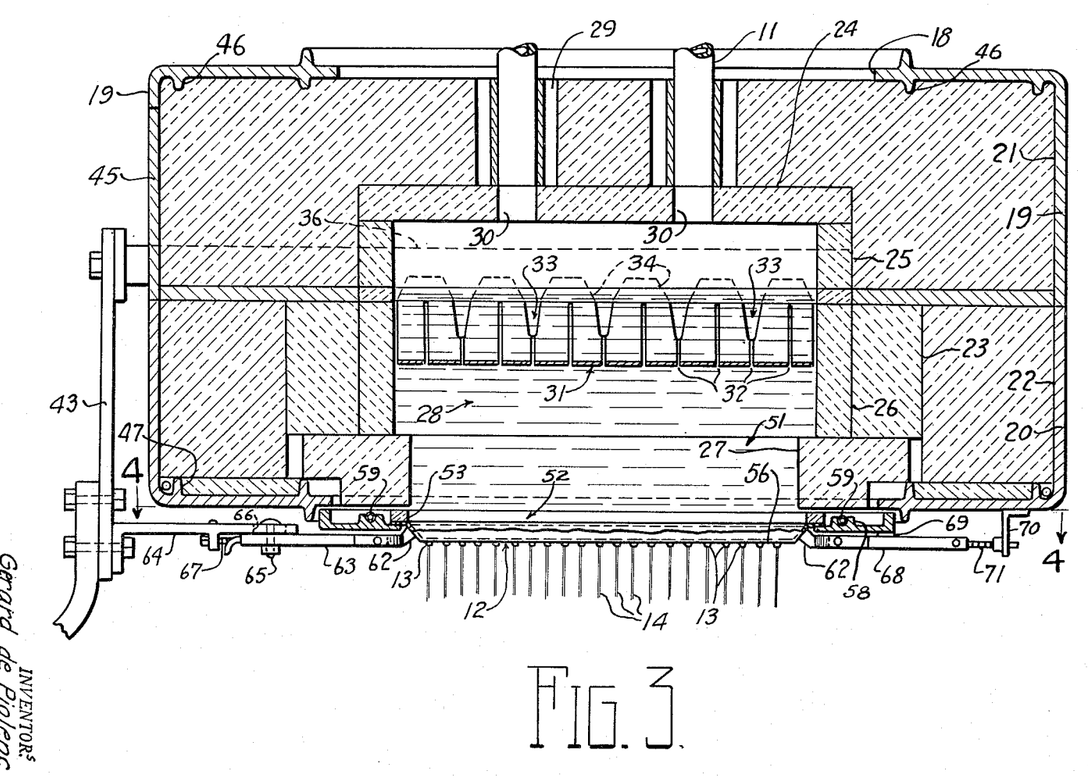
Fig. 3 is a longitudinal vertical sectional view taken substantially on the line 3—3 of Fig. 2.

Considering the furnace unit in more detail, Figs. 2 and 3 disclose how the outer casing 10 has an upwardly open central portion surrounded by a rim 18 through which the material feeding lines 11 or similar feeding means extend. For purposes of ease of assembly, the casing 10 may be fabricated from an upper cover 19 and a lower base 20, the two portions of the casing meeting along a generally median plane to complete the enclosure.

Interiorly of the casing 10 a substantial thickness of insulating material as, for example, blocks 21, 22, 23 and other similar blocks, which preferably are cut from ceramic material, form a heat insulation around other, preferably denser blocks 24, 25, 26 and 27, also preferably fabricated from a ceramic substance. The block 24 which forms a roof, the blocks 25 and 26 which form the upper and lower portions, respectively, of walls, and one or more blocks 27 which form a bottom, cooperate to enclose a glass melting chamber generally indicated by the reference number 28.

In Figs. 2 and 3 it will be observed that the upper insulating blocks 21 meet the lower blocks 22 and 23 and the upper wall forming blocks 25 join the lower wall forming blocks 26 along the same horizontal general median plane in which the cover 19 and base 20 meet. Thus when it is desired to disassemble the structure, for example, to service the interior of the glass melting chamber 28 or to inspect the condition of its constituent or contained elements, the furnace as a whole may be opened along this median plane by lifting off the separate elements composing the upper half of the furnace casing 10, furnace insulation and the glass melting chamber 28.

The material feeding lines 11 extend downwardly through vertical passageways 29 formed by, or cut in, the insulating blocks 21 and are in line with vertical openings 30 in the chamber cover block 24, so that material to be melted is fed directly into the melting chamber 28 from above.

A thin metal melting element 31 is supported in and extends generally horizontally across the melting chamber 28. The melting element is cylindrically curved, its axis lying parallel to the longer dimension of the chamber 28. The element 31 is heated by passing a high amperage, low voltage current therethrough as will be explained later. The heating element 31 lies at a level such that it is entirely submerged in molten and partially melted glass so that heat can be transferred from both sides of the element 31 to the glass, thus resulting in a high efficiency since the area of both surfaces is employed.

The use of a sheet-like element 31, i. e., one having substantial area, not only provides for more efficient heat transfer, but, by also providing a wide current carrying path, local "hot spots" have less effect on the electrical resistance of the element and less adverse effect on the consistency of the melting rate and operation.

Figure 11:
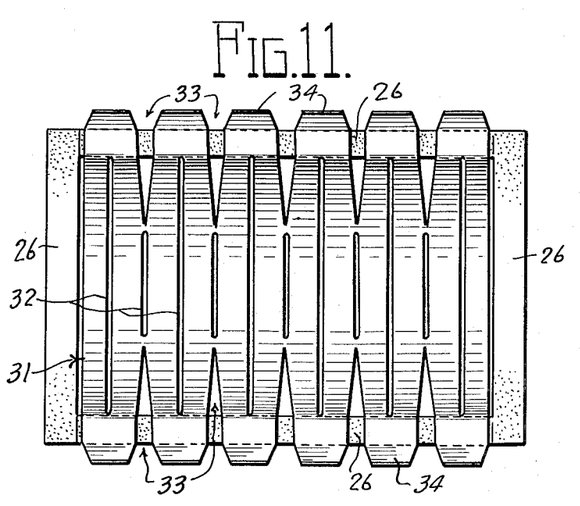
Fig. 11 is a plan view of the heating element employed in the embodiment of the invention illustrated in section in Figs. 1 and 2.

In the embodiment of the invention illustrated in Figs. 2, 3 and 11, the element 31 is perforated to allow the passage therethrough of molten, or liquid glass, and to prevent unmelted lumps of cullet, such as marbles, or chunks, or unfused lumps of batch, from flowing down to the bottom of the melting chamber 28.

Although the specific form of perforations in the element 31 is not critical, and indeed the heating element 31 need not even be perforated at all (see Fig. 12 and description thereof below), certain end objectives must be kept in mind. As mentioned, a considerable area is desirable to provide for efficient transfer of heat from the hot element 31 to the glass. The element also is employed to "screen" out unmelted lumps of material and thus, when perforated, the perforations should be small enough to prevent such passage. The element 31 also serves to interrupt the vertical flow of the glass or glass ingredients, slowing down the rate of flow and "thinning" the moving currents of glass to allow more thorough heating.

In Figs. 2, 3 and 11, the perforations are shown as a group of parallel, circumferentially extending slots 32 in the main portion of the element 31 and a plurality of notches 33 cut in the longitudinal edges of the element 31. The slots 32 and notches 33 may overlap each other and may be spaced as shown, to provide what amounts to a plurality of parallel ribbons, or they may be spaced in other ways.

One advantage of the arrangement shown is that it is almost impossible for a crack to progress all the way across the element parallel to its axis.

Other types of perforated sheets, for examples, grill work, screening, circular openings of small size, etc., may be used but better results probably can be expected where the area of the metal is greater than the area of the perforations, in line with the explanation above of the features desirable for efficient heat transfer.

It will be observed in Fig. 11 particularly, that the element 31 need not reach to the ends of the chamber 28, and its ends may be spaced slightly from the inner sides of the wall blocks 26, forming, in effect, extra slots for the passage of glass around the ends of the element 31.

Figure 12:
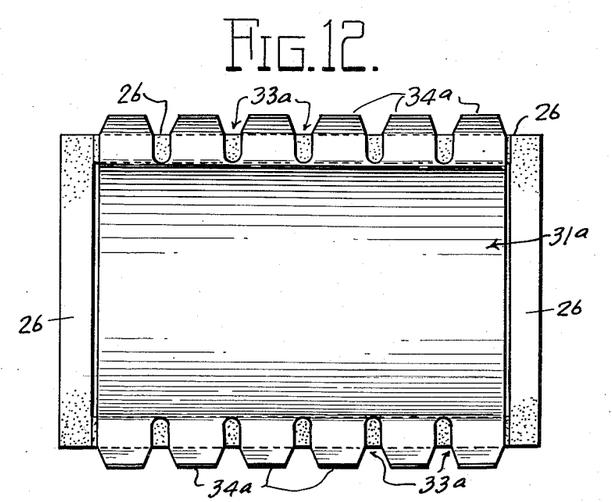
Fig. 12 is a plan view of a modified form of the heating element which may be employed in a furnace embodying the invention.

Referring now to Fig. 12, the extreme case of a heating element 31a with an imperforate body is illustrated. The element 31a is substantially the same shape and size of the perforated element 31 but is imperforate so that all the melted glass flows horizontally to its ends and through the spaces between the ends of the element 31a and the inner sides of the blocks 26. This provides for a thin flow of molten glass over the upper hot surface of the sheet of metal of which the element 31a is formed, resulting in a fined glass. The greater application of heat to the thin molten layer of glass flowing horizontally along the element 31a is relied upon to melt all the raw material but if it is not all melted, it will either remain on the surface of the element 31a from which it can be removed with the furnace open, or it may be screened out when the glass flows through the narrow openings at the ends of the element 31a.

Compromise modifications of the heating element 31 or 31a may be employed with a greater or lesser area of perforations or surface as is found best for the particular type of glass, manner of introduction and use.

In both of the modifications of the heating element 31 shown in the drawings the notches 33 or similar, less deep notches 33a in the element 31a, form tabs 34 or 34a, respectively. The element 31, for example, is bent horizontally at the sides of the heating chamber, lying on the upper edges of the lower-wall-forming blocks 26. Outside the blocks 26, the ends of the tabs 34 or 34a, angle upwardly and outwardly and are inserted in a slot 35 cut in the corner of a square, elongated bus bar 36, one of which extends along the exterior of each of the wall-forming ceramic blocks 25. The bus bars 36 may be further insulated from the blocks 25 by thin slabs of insulating material 37. The ends of the tabs 34 may be wedged into the slots 35 or otherwise tightly joined with the bus bars 36, to provide good electrical and mechanical connection between the bus bar 36 and the tabs 34 of the heating element 31, with emphasis, of course, on the electrical connection. It will be observed that each of the bus bars 36 has four slots 35, one at each of its corners so that if one of the slots 35 is damaged in inserting or removing the edge of a heating element 31 therefrom, the particular bus bar can merely be rotated on its longitudinal axis and a fresh longitudinal slot 35 provided for electrically connecting the bar to the element 31.

In Fig. 12 it is seen that the element 31a has notches 33a along its edges, leaving tabs 34a similar to the tabs 34 of the modification of Fig. 11, even though the notches 33a do not extend into the portion of the element 31a located in the interior of the chamber 28. The notches 33 or 33a serve the purpose of reducing the area and weight of metal that extends out of the hot chamber 28 and thus reduce the amount of heat that is carried out of the chamber and to the bus bars 36.

Each of the bus bars 36 is provided with a longitudinally extending central bore 38 which is connected at each end to cooling fluid conduit 39 (Fig. 2). The passage of coolant through the bus bars 36 serves to carry away much of the heat created by the flow of electrical current and escaping from the melting chamber 28 and thus reduces the temperature gradient across the insulating blocks 21 so they can be thinner and thus consume less space.

The horizontal portions 40 of the tabs 34 at each side of the heating element 31 are pressed between the edges of the lower side-forming ceramic blocks 26 and the bottom edges of the upper side forming blocks 25 or small strips of ceramic 41 inserted therebetween.

Figures 6, 7, 8:
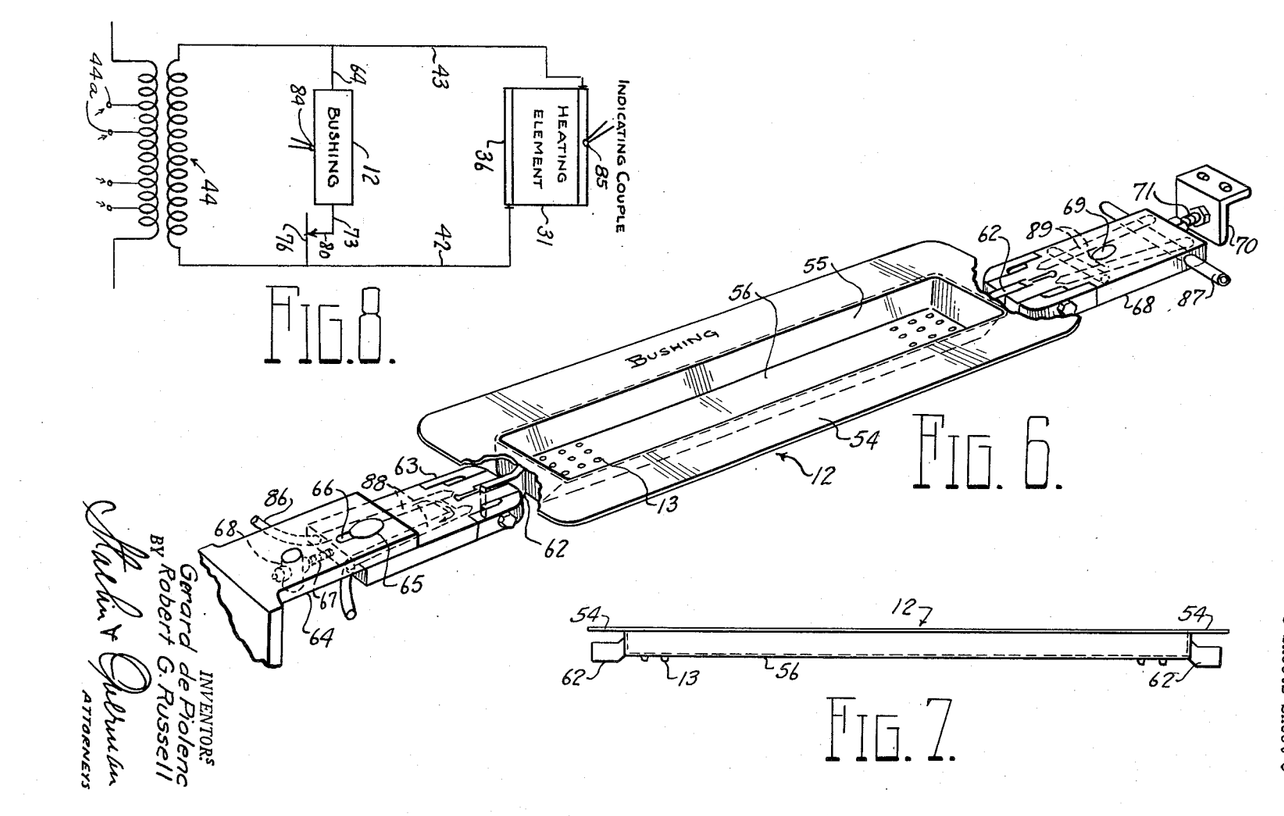
Fig. 6 is a fragmentary detailed view in perspective of the bushing shown in plan in Fig. 4 and showing its electrical connections.
Fig. 7 is a side view in elevation of the bushing shown in Fig. 6.
Fig. 8 is a simplified wiring diagram of the electrical heating elements employed in a furnace embodying the invention.

Each of the bus bars 36 is mechanically and electrically connected to a heavy conductor bar 42 or 43 as the case might be to place the bus bars 36 and heating element 31 in series between the two sides of a line from the secondary coil of a transformer 44 (see Fig. 8).

The cover 19 of the casing 10 may be provided with a rear opening 45 (see Fig. 3) through which the electrical connections from the conductor bar 43 and its bus bar 36 may extend and also is provided with a plurality of inwardly turned ribs 46 (Figs. 2 and 3) for structural strength and for holding the several blocks of ceramic 21 stationarily in place in the interior of the furnace casing 10.

The base 20 of the casing 10 similarly is provided with upwardly turned structural ribs 47 which similarly strengthen its bottom plate 48 and similarly help to maintain the ceramic blocks 22, 23 and the bottom ceramic block 27 in their proper relative location. The plate 48 has an elongated generally centrally located opening 49 which, in the embodiment shown, is rectangular in plan. A downwardly extending portion 50 of the chamber bottom block 27 protrudes through the opening 49 and in turn has a long relatively narrow opening 51 which communicates at its upper end with the larger glass melting chamber 28 and at its lower end is in line with an opening 52 of the same size formed in a ceramic plate 53 which rests on a flat perimetrical lip 54 of the bushing 12 (see also Fig. 6). The central portion of the bushing 12 consists in a depressed panlike portion 55 of the same general size and located beneath the openings 51 and 52 in the chamber forming bottom block 27 and ceramic plate 53.

Molten glass flowing downwardly through the openings 51 and 52 from the glass melting chamber 28 flows into the pan 55 and through the orifices 13 formed in a bottom plate 56 of the pan-like portion 55 of the bushing 12.

Figure 4:
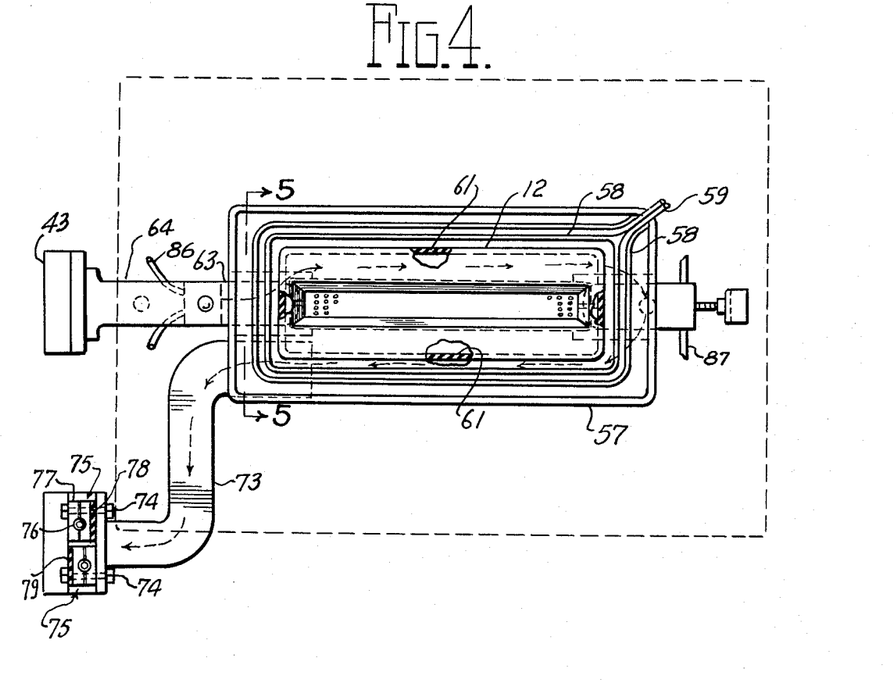
Fig. 4 is a horizontal sectional view taken substantially from the position indicated by the line 4—4 of Fig. 3 and showing a glass filament forming bushing with which a furnace embodying the invention is equipped.
Figure 5:
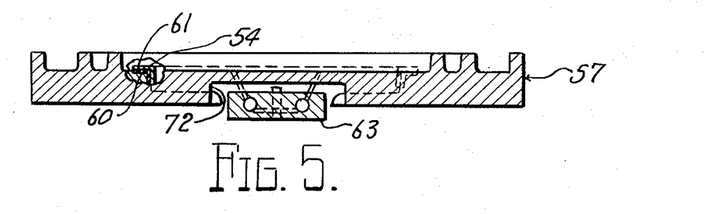
Fig. 5 is a further enlarged vertical sectional view taken substantially on the line 5—5 of Fig. 4.

The bushing 12 is structurally supported in position beneath the glass melting chamber 28 and effectively extending across its bottom, by a heavy cast bushing plate 57 (see also Figs. 4 and 5). The plate 57 is fabricated from electrical conducting metal but does not come into contact with molten glass so it can be made of a base metal with high conductivity and substantial strength. The upper surface of the plate 57 is provided with parallel ridges 58 between which (Figs. 3 and 4) a cooling tube 59 is led thus to carry away heat transferred to the plate 57 by reason of its close proximity to the bushing 12 and openings 51 and 52 through which the molten glass flows.

The lower surface of the lip 54 of the bushing 12 is electrically insulated from an edge 60 of a central opening through the plate 57 by means of a thin layer of electrical insulation 61.

Each end of the bushing 12 is provided with a terminal lug 62. The left-hand lug 62 (Figs. 3, 6 and 7) is grasped between the bifurcations of a split connecting block 63. The block 63 is adjustably mounted on a conductor bracket 64 that is in turn mounted upon the conductor bar 43 by a bolt 65 which extends through a slot 66 in the bracket 64 and the relative positions of the block 63 and bracket 64 are controlled by an adjusting screw 67 threaded into a post secured on the bottom of the bracket 64. The block 63 and bracket 64 form both a mechanical and electrical connection for the end of the bushing 12.

The other end of the bushing 12 (the right end in Figs. 3, 4, 6 and 7) is electrically connected through its lug 62 to a similar connector block 68 extending between bifurcations in the end of the block 68 and from the block 68 is electrically connected to the end of the plate 57, current being conducted therebetween by a slug of metal 69 (Figs. 3 and 6). The block 68 is mechanically supported and positioned first by being secured to the lug 62 and secondly by a bracket 70 mounted on the bottom of the case base 20 and secured to the block 68 by a position adjusting screw 71.

As is most clearly shown in Fig. 5 the bushing support plate 57 is cut away, forming a tunnel-like opening 72 at its left end (Figs. 4 and 6) to eliminate any possibility of electrical contact between the connector block 63 and the plate 57.

The left lower corner (Fig. 4) of the bushing support plate 57 is electrically connected to and mechanically supported by a conductor arm 73. The arm 73 is mounted upon the conductor bar 42 by a pair of locking bolts 74 which also retains two pairs of tube holders 75 and a variable resistance tube 76. Each of the tube holders 75 consists in a pair of grooved blocks 77 which are clamped on opposite sides of one arm of the tube 76. One of the tube holders 75 is electrically insulated from a pad on the end of the arm 73 by a strip of insulation 78 and the other is similarly insulated from the bar 42 by a similar insulator 79. The tube 76 is made of conducting metal, filled with water.

A movable jumper 80 consisting of two conducting bars 81, two clamping plates 82 and lock bolts 83 is slidable up and down the U-shaped tube 76 to vary its resistance thus to balance the current flowing between the heating element 31 and the bushing 12, see Fig. 8.

The path of electrical current through the bushing thus proceeds from the conductor bar 43 through the bracket 64, the connector block 63, the connector lug 62, the bushing 12, the connector lug 62, the connector block 68, the contact slug 69, the bushing support plate 57, the arm 73, one of the holders 75, the tube 76, the jumper 80, the other arm of the tube 76 and the other holder 75 to the conductor bar 42. This flow of current is indicated by the large arrows in Fig. 4 and by reason of such connection, the bushing 12 is placed in parallel with the heating element 31 (see Fig. 8).

Current to the heating element 31 and bushing 12 when connected as shown in Fig. 8, is controlled by a thermocouple 84 mounted on the bushing 12 which actuates conventional mechanism for connecting various ones of several taps 44a of the primary coil of the transformer 44 to current source as current requirements change. Under these circumstances, a thermocouple 85 on the heating element 31 serves only to indicate its temperature.

Each of the bushing connector blocks 63 and 68 is cooled by flow of coolant through tubes 86 for the block 63 and 87 for the block 68 which are connected in the blocks 63 and 68 respectively to drilled passages 88 and 89 respectively. The use of coolant in the terminal or connector blocks 63 and 68 reduces the heat transferred from them to their attached structural elements such as the bracket 64 and adjusting screws 71 in its mounting bracket 70.

In addition to the improved efficiency in heat transfer resulting from the complete submergence of the heating element 31 in the molten glass so that both of its surfaces are effective, several other improvements and advantages result from an arrangement and construction embodying the invention.

In furnaces where noble metal is used to form the entire casing for the heating chamber, the inner surface only of the metal is effective for heating the glass. The exterior surface, of course, also is heated and this heat must be prevented from escaping from the furnace if possible. It is necessary, therefor, to use a greater thickness of insulating material on the exterior of the chamber if the chamber walls are formed by heating material. In the furnace of the invention, on the other hand, the walls are formed by insulating material which is not heated itself, but only by the glass pool contained thereby and less heat must be retained so that the walls can be thinner and lighter in weight.

As briefly mentioned above, an additional improvement results from eliminating the glass air line which must exist where a pool of glass stands in a metal container. It is at this line that the metal of the conventional furnace of this type is most deleteriously effected by the corrosive action of the glass and air. In a furnace of the invention, the heating element is submerged so no air reaches it.

By thus improving the heat transferral efficiency which allows the heating element to be operated at a lower temperature and by protecting it from air, noble metal is not required. The saving in cost and release of scarce metal are very substantial and important.

From an operating standpoint, the submergence of a heating element extending over substantially all of the area of the melting chamber 28 substantially eliminates temperature gradients in the glass pool resulting in more uniform melting and better glass for use. In the conventional constructions where the walls of the heating chamber and its bottom were relied upon to transfer heat to the glass, it was necessary to heat these peripheral elements to a temperature above the average of the pool so that the glass at the center of the pool would reach proper temperature. The heating element of a furnace embodying the invention, of course, is more nearly the same in temperature as the pool and the pool substantially uniform.

Another and different operation advantage also results from submerging the heating element in the glass rather than placing it around the glass and even more so from extending the heating element substantially across the heating chamber. Almost all glass contains bubbles of gas, called "seeds," which must be removed as completely as possible, particularly where the glass is drawn into fine fibers measured in microns which may, indeed, be less in diameter than the "seeds." The process of removing the "seeds" is called "fining" and is accomplished during the heating of the glass. In some instances, the glass is run in a thin layer so that it is thoroughly and completely heated thus driving off the gas.

In a furnace of the invention, because the heating element extends over substantially the entire area of the heating chamber, all the glass flowing through the furnace must pass near the heated element in a thin film which effectively "fines" all the glass and not merely the thin layer moving down the walls or past individual heating bars or wires that may be stretched across the chamber. The shape of the heating element 31 shown in the drawings, i. e., its upward curvature, helps carry the seeds up and out of the mass of glass which is a further improvement over merely a flat horizontally extending heating element embodying the invention. The upwardly concave element is, therefore, a preferred modification.

Having described the invention, we claim:

1. In a glass melting furnace, in combination, a generally rectangular glass melting chamber having an at least partially open top and bottom, means for feeding material to be melted into the top of said chamber, glass forming means extending across the open bottom of said chamber, a sheet-like metal electrical resistance heating element extending generally across said chamber at a level therein beneath the surface of a pool of glass therein, said heating element being cylindrically curved and upwardly concave, and electrical means for controlled energization of said heating element.

2. A furnace according to claim 1 in which the heating element is perforated and located in screening position across the chamber.

3. A furnace according to claim 1 in which the heating element is cylindrically curved on an axis parallel to the longer horizontal dimension of the chamber.

4. A furnace according to claim 1 in which the glass forming means consists in a metal plate-like bushing having a plurality of fiber forming orifices therein and is also a resistance heater.

5. A glass furnace comprising, in combination, a casing, a casing lining of ceramic heat insulating material forming an interiorly located generally rectangular glass melting chamber having an opening in its roof and an at least partially open bottom, a noble metal fiber forming bushing extending across the open bottom of said chamber and supported in position by said casing, electrical means for energizing said bushing, a thin metal screen-like heating element supported in said chamber and extending thereacross at a level beneath the surface of a pool of glass therein, electrical means connecting said heating element to a source of electrical energy, said heating element being cylindrically curved on an axis parallel to the longer horizontal dimension of said chamber, and control means for said electrical means responsive to glass temperature for maintaining said heating element and said bushing at proper temperatures.

6. In a furnace according to claim 5, the improvement that consists in a heating element having circumferentially extending perforations therethrough for the passage of molten glass.

References Cited in the file of this patent

UNITED STATES PATENTS

| Number | Name | Date |
| --- | --- | --- |
| 1,928,288 | Henry | Sept. 23, 1933 |
| 2,159,361 | Atkinson et al. | May 23, 1939 |
| 2,165,318 | Thomas et al. | July 11, 1939 |
| 2,212,528 | Slayter | Aug. 27, 1940 |
| 2,314,956 | Slayter et al. | Mar. 30, 1943 |
| 2,335,135 | Staelin | Nov. 23, 1943 |
| 2,482,299 | Stevens | Sept. 20, 1949 |